McKEAN MAFFITT & P. H. WILLIAMS.
WATER METER.
APPLICATION FILED APR. 15, 1909.
956,121.
Patented Apr. 26, 1910.
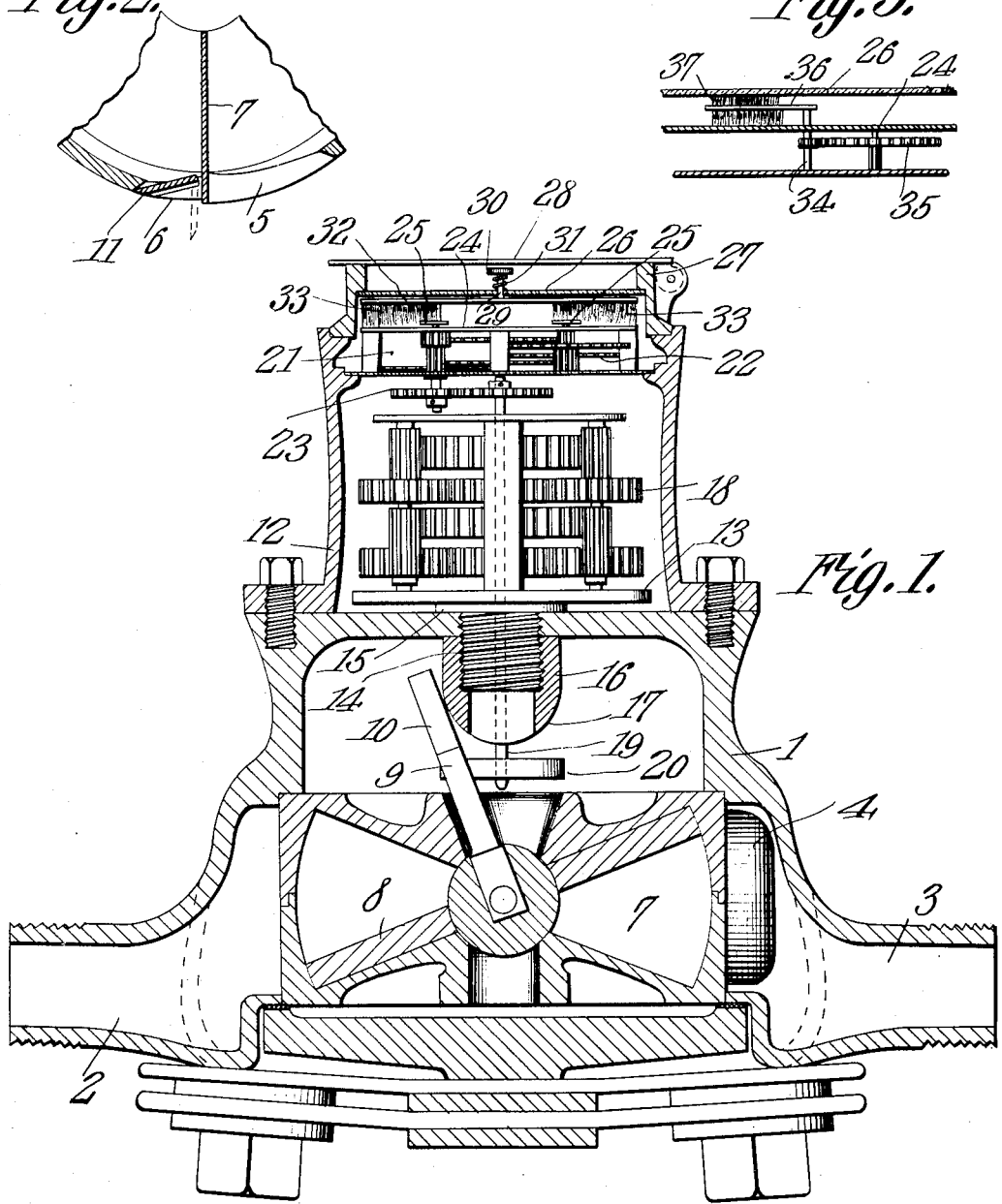

UNITED STATES PATENT OFFICE.

M'KEAN MAFFITT AND PATRICK H. WILLIAMS, OF CHARLOTTE, NORTH CAROLINA.

WATER-METER.

956,121.

Specification of Letters Patent.    Patented Apr. 26, 1910.

Application filed April 15, 1909. Serial No. 490,077.

*To all whom it may concern:*

Be it known that we, M'KEAN MAFFITT and PATRICK H. WILLIAMS, citizens of the United States, residing at Charlotte, in the county of Mecklenburg, State of North Carolina, have invented a new and useful Water-Meter, of which the following is a specification.

This invention has relation to water meters, and it consists in the novel construction and arrangement of its parts, as hereinafter shown and described.

The object of the invention is to provide a water meter, the parts of which are so arranged that the structure may be easily and readily cleaned at a minimum expenditure of time and labor, and also to provide in such a structure means for manually or automatically (as desired) cleaning the dial of the meter, so that the state of the meter may be quickly and accurately determined without necessitating the removal of the bonnet or other parts of the meter for the purpose of removing accumulated matter from the face of the dial.

Another object of the invention is to provide a meter which is sensitive and durable, and which is noiseless in operation, the parts being so arranged as to remove as far as possible and decrease to a minimum the working parts coming in contact with the column of water passing through the meter, and to render it impossible for a consumer or other unauthorized person to set back the meter or run the meter backward, and for making provision within the meter structure whereby it is not necessary to place a check-valve upon the service pipe, to protect the meter.

In the accompanying drawings: Figure 1 is a vertical sectional view of the meter. Fig. 2 is a horizontal sectional view of a portion of the disk chamber of the meter. Fig. 3 is a vertical sectional view of a modified form of dial-cleaning means which may be used in the meter.

The meter includes a body or casing 1, having a water inlet 2 and a water outlet 3. A disk-chamber 4 is located in the lower portion of the casing 1 and is provided with a water inlet port 5 and a water outlet port 6. The said ports 5 and 6 are separated from each other by a radially disposed partition 7, located within the chamber 4. A disk 8 is located in the chamber 4 and is mounted for movement or gyration, as is usual in devices of this nature. The stem 9 of the disk projects through an opening provided in the upper side of the chamber 4, and at its upper extremity is provided with a cap 10, preferably of hard rubber or similar material. A check-valve 11 is located in the outlet port 6 of the chamber 4, and, in the present instance, said valve is in the form of a curved plate or leaf, which is pivotally attached at its upper and lower portions to the upper and lower sides of the outlet port 6 of the chamber 4, and in the vicinity of the partition 7.

A hood 12 is mounted upon the top of the body 1 and a base-plate 13 is located in the said hood 12 upon the top of the body 1. The plate 13 is provided with an externally threaded boss 14, which passes through a threaded perforation in the top of the body 1, and which, at its upper end, is provided with an annular shoulder 15, which is adapted to seat against the upper surface of the body 1 about the perforation in the top thereof which receives the threaded portion of the boss 14. A stuffing box 16 is screwthreaded upon the lower portion of the boss 14 and is adapted to bear at its upper edge against the under surface of the top of the body 1. The lower portion of the stuffing-box 16 is hemi-spherical, as at 17, and it is against the said hemi-spherical portion that the cap 10 carried by the stem 9 is adapted to bear as the disk 8 describes its gyratory movement. An intermediate train of gears 18 is mounted upon the plate 13 and derives movement from a shaft 19 which passes vertically through the center of the boss 14, and which, at its lower end, is provided with an arm 20, which lies in the path of movement of the stem 9 of the disk 8. The hood 12 may contain a plenum of air, or may be used as an oil chamber for retaining a column of oil about the gear train 18 for the purpose of lubricating the several parts of the said gear train. A counter 21 is mounted upon the hood 12 and is provided with a train of counter gears 22, which are operatively connected with the gear train 18 through the intermeshing gear-wheels 23. A dial 24 forms one of the component parts of the counter 21, and hands 25 are arranged for rotary movement over the face of the dial 24 and are operatively connected with the counter train of gears 22. A glass 26 is located over the counter 21 and is held in a bonnet 27, which in turn is provided with a hinged cover 28.

From the above description it will be seen that as a column of water passes through the chamber 4 and actuates the disk 8 contained therein and passes out through the outlet 3, that, by reason of the fact that the outlet of the chamber 4 is provided with a valve 11, the water passing from the meter is prevented from being forced backward in the service pipe. It will also be seen that by the provision of the valve indicated, water is prevented from draining back into the body of the meter in case the water to the premises is cut off. By this arrangement the full force of a water-hammer, acting upon the disk 8 is lessened or avoided, and thus the disk 8 is protected against rupture in consequence of such water-hammer or knocking of water in the pipes with which the meter may be connected. The provision of the valve 11 at the point indicated also prevents oscillation of the disk from any cause except the proper passage of the column of water through the chamber 4, and movement on the part of the disk 8 is prevented as a consequence of pulsation in the column of water.

In the form of meter as illustrated in Fig. 1 of the drawings the glass 26 is provided with a central perforation in which is journaled a vertically disposed shaft 29. A knob 30 is fixed to the upper end of the said shaft and a coil spring 31 surrounds the shaft and is interposed between the upper surface of the glass 26 and the under side of the knob 30. The said spring 31 is under tension with a tendency to hold the knob 30 away from the glass 26. To the lower end of the shaft 29 and below the lower surface of the glass 26 is attached radially disposed arms 32, each of which carries a set of bristles 33, constituting brushes. The sets of brushes 33 are radially disposed with relation to the face of the dial 24, and the said brushes are of such length that when the shaft 29 is rotated the lower ends of the bristles of which the brushes 33 are composed will sweep across the upper sides of the hands 25 and the characters upon the face of the dial 24 over which the said hands 25 operate. Thus it will be seen that means is provided for easily and quickly removing sediment or dirt from the face of the dial and from the hands 25.

By swinging the cover 28 back, an operator may turn the knob 30 and the shaft 29, and if the knob is held or permitted to remain in an elevated position, the arms 32 will wipe against the under side of the glass 26 and remove accumulated matter therefrom. When the under side of the glass 26 has been sufficiently cleaned the operator may depress the shaft 29 against the tension of the spring 31, and thus the lower ends of the brushes will be brought into contact with the hands 25 and the dial face, and the said dial and hands may be cleaned by manually rotating the shaft 29 as indicated.

In the form of cleaner as illustrated in Fig. 3 of the drawings, an automatically operated device will be seen. In this structure the glass 26 is imperforate, but a shaft 34 is journaled for rotation below the said glass 26 and receives rotary movement from intermeshing gear wheels 35, which in turn derive their movement from the counter train 22. A radially disposed arm 36 is fixed to the upper end of the shaft 34 and is provided with a set of bristles 37, the upper ends of which have contact with the lower surface of the glass 26, and their lower ends are adapted to sweep over the upper face of the dial 24. Inasmuch as the intermeshing gear wheels 35 are in constant rotation while a column of water is passing through the meter, it will be seen that during such time the shaft 34 will be rotated and the arm 36 will be carried around. As the arm 36 rotates about the axis of the shaft 34 the upper ends of the bristles 37 sweep against the lower surface of the glass 26 and remove accumulated matter therefrom, while the lower ends of the said bristles 37 clean the face of the dial, thus rendering it possible for one who is about to take the state of the meter to accurately determine the condition or points of indication of the several hands used in the counter.

What is claimed is:—

1. A meter comprising a body, a disk-chamber located therein, a disk located in said chamber and having a stem, a hood mounted upon the body, and having an externally threaded boss with an outstanding shoulder located thereon, a gear train located under the hood, a shaft passing concentrically through the boss and operatively connected with the gear train, a stuffing-box located in the body and screw-threaded upon the boss and having a globular portion upon which the stem of the disk is adapted to operate, and an arm carried by the said shaft.

2. A meter comprising a body, a disk-chamber located therein, a disk located in the chamber and having a stem projecting through the upper portion of the same, a hood located upon the top of the body, a base-plate located in the hood and having a depending boss provided with an outstanding shoulder, said boss passing through the top of the body and the shoulder bearing against the upper side of the body, a gear train supported upon the base, a shaft passing through the boss of the base-plate, and having at its lower end an arm adapted to be operated by the stem of the disk, a stuffing-box screw-threaded upon the lower portion of the boss and having a globular surface against which the stem of the disk is adapted to operate.

In testimony that we claim the foregoing as our own, we have hereto affixed our signatures in the presence of two witnesses.

M'KEAN MAFFITT.
PATRICK HENRY WILLIAMS.

Witnesses:
J. B. REESE,
F. K. GARDNER.